United States Patent
Ding et al.

(10) Patent No.: US 6,819,534 B2
(45) Date of Patent: Nov. 16, 2004

(54) THREE-IN-ONE PROTECTION CIRCUIT AGAINST OUT-RUSH CURRENT, SHORT CIRCUIT AND OVERLOAD

(75) Inventors: Tino Ding, Pingtung (TW); Saw-You Tsai, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 256 days.

(21) Appl. No.: 10/259,904

(22) Filed: Sep. 30, 2002

(65) Prior Publication Data

US 2003/0202297 A1 Oct. 30, 2003

(30) Foreign Application Priority Data

Apr. 26, 2002 (TW) .................................... 91205792 U

(51) Int. Cl.[7] .............................................. H02H 7/00
(52) U.S. Cl. ......................................... 361/18; 361/92
(58) Field of Search ............................ 361/18, 79, 88, 361/89, 92, 93.1, 93.4, 93.7, 94, 95, 96, 97; 323/276, 277; 363/34, 37, 49, 50, 56.03, 74, 78, 79

(56) References Cited

U.S. PATENT DOCUMENTS 4,447,841 A * 5/1984 Kent ............................ 361/18
4,791,544 A * 12/1988 Gautherin et al. ............ 363/49

OTHER PUBLICATIONS

US 2003/0169606 A1 Pub. Date Sep. 11, 2003 Miermans.*

* cited by examiner

Primary Examiner—Ronald Leja
(74) Attorney, Agent, or Firm—Birch, Stewart, Kolasch & Birch, LLP

(57) ABSTRACT

The invention related to a three-in-one protection circuit against out-rush current, short circuits and overloading. A second power source connected to the output side of a transformer in a power supply is used as a power source when the protection function is activated. This is in order to provide the power source for a protection circuit when a short circuit happens at an output end. A current sensor connected to the output side of the transformer is used to sense the occurrence of an overload current and a timer is used to set the time that a specific out-rush current can be yielded to allow and limit the yielding of the out-rush current. Therefore, an executor for activating protection function can be used in the above-mentioned three-in-one protection circuit simultaneously at the same circuit.

14 Claims, 6 Drawing Sheets

THREE-IN-ONE PROTECTION CIRCUIT AGAINST OUT-RUSH CURRENT, SHORT CIRCUIT AND OVERLOAD

BACKGROUND OF THE INVENTION

1. Field of Invention

The invention relates to a power source protection circuit, and more particularly to a three-in-one protection circuit against an out-rush circuit, short circuit and overload circuit.

2. Technical Background

Normally, a power supply has its own rated output power, output voltage and output current. The power supply can work normally in these rated working ranges. A protection circuit for protecting the circuit of the power supply must be designed to prevent operation over the rated work range. For example, the power supply needs to provide an out-rush current when a large-scale electromagnetic contactor is activated. This current is several times (1.5 to 3 times or higher) larger than the overload current and many more times (approximately 7 times or higher) larger than the rated current. Therefore, the protection for these out-rush and short circuits is always considered when a power supply is designed.

Please refer to FIG. 1, which shows the circuit block diagram of the conventional protection circuit against an out-rush current and overload. The voltage variation characteristics of the subordinate coil of a transformer 103 are used to design the circuit. The protection circuit comprises a few parts: an executor for activating protection function 107, a judgment device 108, a first voltage level generator 111, a second voltage level generator 104, a first timer 110, a second timer 105 and an executor for keeping system shut down 109. Other parts such as the AC power source 101, the rectifier 102, the transformer 103 and control system 106 are the main elements for a normal power supply.

Here, the executor for activating protection function 107 is used to force the control system to shut down. The judgment device 108 is responsible for judging whether protection against an out-rush current and overload current is processed. The T2 timer 110 is used to limit the output time of an out-rush current and overload current. The executor107 is not informed and the system does not enter into the protection state if the counting of the timer is not completed. The first voltage level generator 111 generates an accurate voltage level to the executor 107 so that its internal comparator therein has a reference level for comparison. The executor 109 informs the executor 107 of shutting down the control system 106. The second timer 105 is used to limit the shutdown time of the control system 106. The second voltage level generator 104 generates an accurate voltage level to the executor 109 so that its internal comparator therein has a reference level for comparison.

The operation of the whole circuit is described as follows:

The output voltage of the subordinate circuit of the transformer becomes larger when the output current increases continuously. The judgment device 108 determines whether the protection is activated according to the output current or output voltage of the transformer 103. The executor 107 would activate the first timer 110 if the protection circuit needs to be activated. When the first timer 110 completes counting and the output current is still larger than the predetermined overload current level, the executor 107 would then shut down the control system 106. The executor 109 is activated simultaneously to force the executor 107 to keep shutting down the control system 106. These two executors form a cooperation relationship (mutually locking). The second timer 105 starts counting after the executor 109 is activated. The control system 106 would stay in a shutdown state during the counting period. The protection function is disabled and the control system 106 would try to activate the system again after the counting of the second timer 105 is completed. The output voltage and current appear as square waves if the output current is still larger than the predetermined overload current level.

The protection circuit mentioned above is mainly designed for the protection of an out-rush circuit and overload circuit, but does not consider the short circuit. As a result, when short-circuit happens, the power supply would keep generating huge output current and result in severe heat dissipation, and damage some parts accordingly. It would be better to integrate a short-circuit protection function into the protection circuit of the power supply.

SUMMARY OF THE INVENTION

The invention provides a three-in-one protection circuit against an out-rush circuit, short circuit and overload. It can protect a power supply from being damaged due to a short circuit, the occurrence of an out-rush current or an overload.

To achieve the above-mentioned purpose, a three-in-one protection circuit of the invention is applied in a power supply with a transformer and a control system. It comprises a second power source, a current sensor, a voltage level generator, a timer and an executor for activating protection function. The second power source, the current sensor and the voltage level generator are all connected to the output side of the transformer. The timer receives the signal corresponding to output current from the current sensor. The executor for activating the protection function is connected to the control system, the second power source, the voltage level generator and the timer.

The timer starts counting when the power supply outputs an out-rush current. The larger the output current comes, the shorter the timer counts. A shutdown signal is sent to the control system when the predetermined time is up. When a short circuit occurs at the output end of the power supply, the voltage level from the voltage level generator decrease to zero and makes the executor for activating the protection function send a shutdown signal to the control system. When the output current is larger than the predetermined overload current level, it would start counting and would generate an overload protection control signal to the executor for activating protection function when the predetermined time is up. The executor for activating protection function also sends a shutdown signal to the control system when it receives the above overload protection control signal.

The second power source provides electricity after the executor sends the shutdown signal; the control system would try to start working when the energy of the second power source is consumed and the protection function is then disabled.

Moreover, the invention provides another three-in-one protection circuit against an out-rush current, short circuit and overload. It comprises a second power source, a current sensor, a first voltage level generator, a signal amplifier, a noise filter, a first timer, an executor for activating protection function, a second voltage level generator, an executor for keeping the system shut down and a second timer. The second power source, the current sensor and the first voltage level generator are all connected to the output side of the transformer. The first timer is used to receive the output current signal that is transmitted from the current sensor to the signal amplifier and the noise filter. The executor for activating the protection function is connected to the control system, the second power source, the first voltage level generator and the first timer.

The first timer starts counting when the power supply generates an out-rush current. A shutdown signal is sent to the control system when the predetermined time is up. The voltage level from the first voltage level generator decreases to zero when a short circuit occurs at the output end of the power supply, and the executor for activating the protecting function sends a shutdown signal to the control system. Counting is started when the output current is larger than the overload current, and an overload protection control signal is generated when the predetermined time is up. The executor for activating the protection function also sends a shutdown signal to the control system when it receives the above overload protection control signal.

The executor for keeping the system shut down is connected to the control system, the executor for activating the protection function and the second voltage level generator. It shuts down the system when it receives the shutdown signal transmitted from the executor for activating the protection function. The second timer connected to the executor for activating the protection function and the executor for keeping the system shut down starts counting when the executor for activating the protection function sends out a shutdown signal. The executor for keeping the system shutting down sends a work-starting signal to the control system when the time is up, and the control system would try to start working.

Also, the second power source comprises a rectifier circuit and a RC discharger circuit. The timer can be the RC charger or discharger circuit. The current sensor can be a resistor.

BRIEF DESCRIPTION OF DRAWING

Other objects, features, and advantages of the invention will become apparent from the following detailed description of the preferred but non-limiting embodiments. The description is made with reference to the accompanying drawings in which.

DETAILED DESCRIPTION OF THE INVENTION

A signal corresponding to the output current obtained from a current sensor (may be a resistor) is used in the protection circuit of the invention to judge whether the overload protection needs to be processed. The protection circuit would not force the system to stop working immediately when an overload occurs but would delay for a determined time so that an out-rush current is temporarily allowed during the delayed time. The system is kept stoping working because the protection circuit would earth the power of the control system to the primary ground or triggers the shutdown function of the control system. The system is then allowed to start again after a period of time. The output voltage is shown as a square waveform if the system is kept in an overload situation.

The protection circuit also has a protection function against a short circuit when the short circuit occurs at the output end. The protection circuit still can work normally even if the output voltage becomes zero due to the short circuit because the source energy of the protection circuit is provided by another power source. The operations of the protection circuit for the short circuit and the overload are similar. The system stops outputting after a certain time when a short circuit occurs. A large short current will occur at this time. Although it is very large, the time period is shorter than the delay time of the overload so that the average power loss is very low during a short circuit.

Two embodiments of the invention according to the concept mentioned above will be provided as follows.

Figure 1:
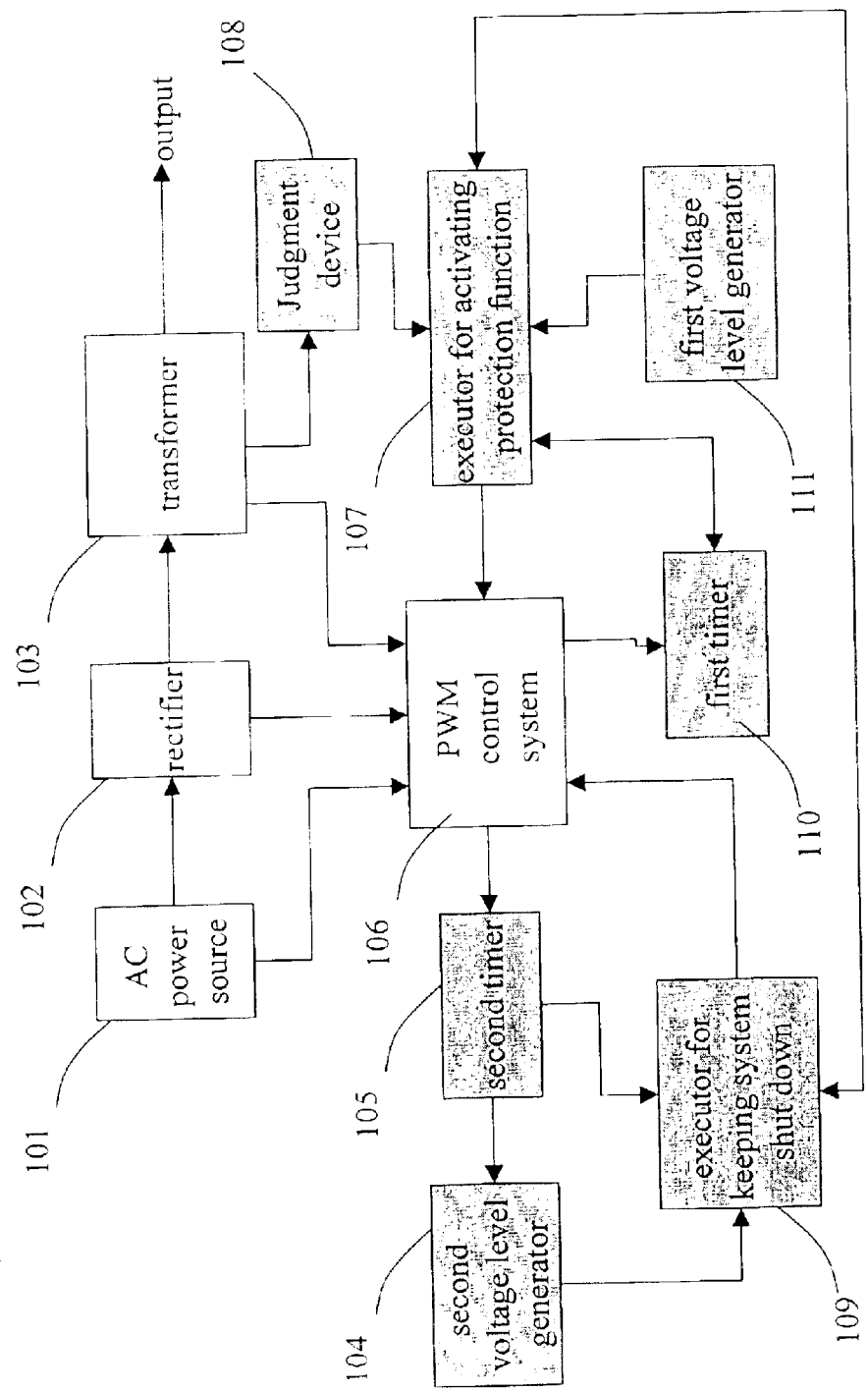
FIG. 1 is a block diagram of the protection circuit against an out-rush current and overload according to the prior art.
Figure 2:
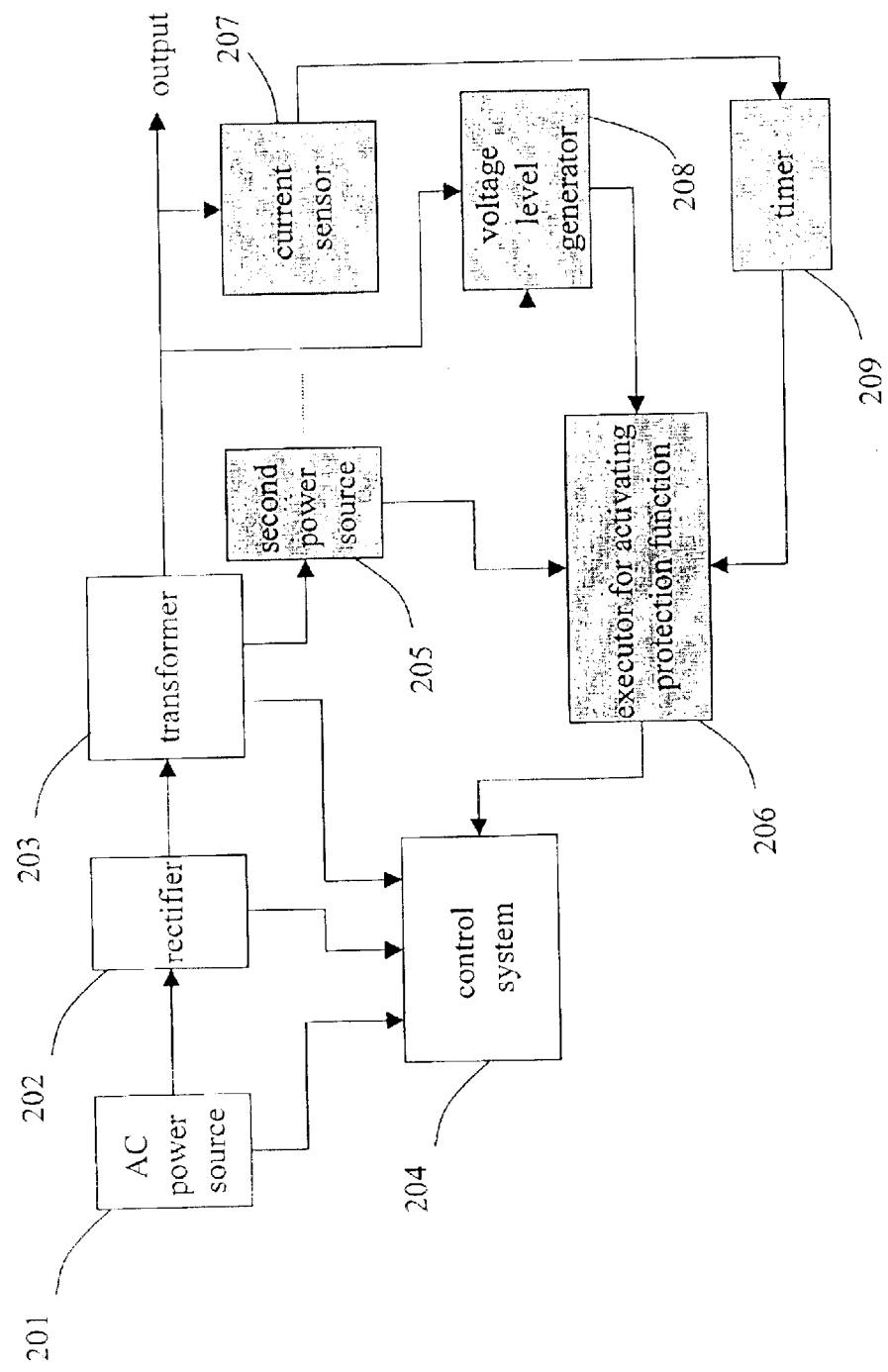
FIG. 2 is a block diagram of a three-in-one protection circuit against an out-rush current, short circuit and overload of a first preferred embodiment of the invention.

Please refer to FIG. 2, which shows the first preferred embodiment of the invention for a three-in-one circuit against an out-rush current, short circuit and overload. The protection circuit comprises a second power source 205, an executor for activating the protection function 206, a current sensor 207, a voltage level generator 208 and a timer 209. Other parts such as an AC power source 201, a rectifier 202, a transformer 203 and a control system 204 are the normal components of a power supply.

The transformer 203 provides the second power source 205 of the protection circuit. Two function blocks use this second power source 205: the executor for activating the protection function 206 and the voltage level generator 208 (the virtual arrow line between the second power source 205 and the voltage level generator 208 means the power to the voltage level generator 208 may be provided directly by the transformer 203 instead of the second power source 205). There is still energy transformation in the transformer 203 when a short circuit occurs. Although it is small, it is enough for the protection circuit to work normally.

Figure 3:
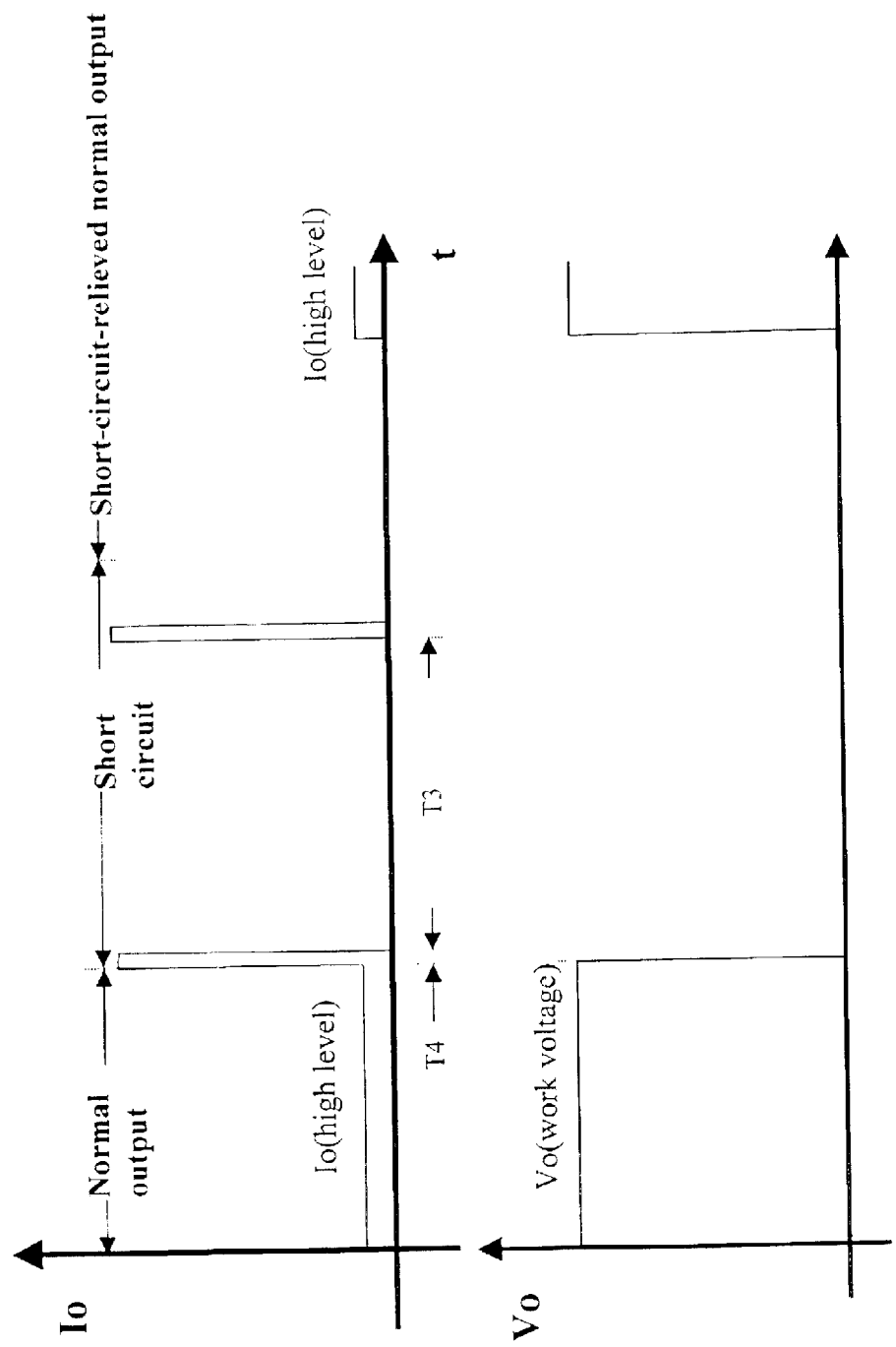
FIG. 3 is a sequence graph of the preferred embodiments of the invention, illustrating short circuit protection.
Figure 4:
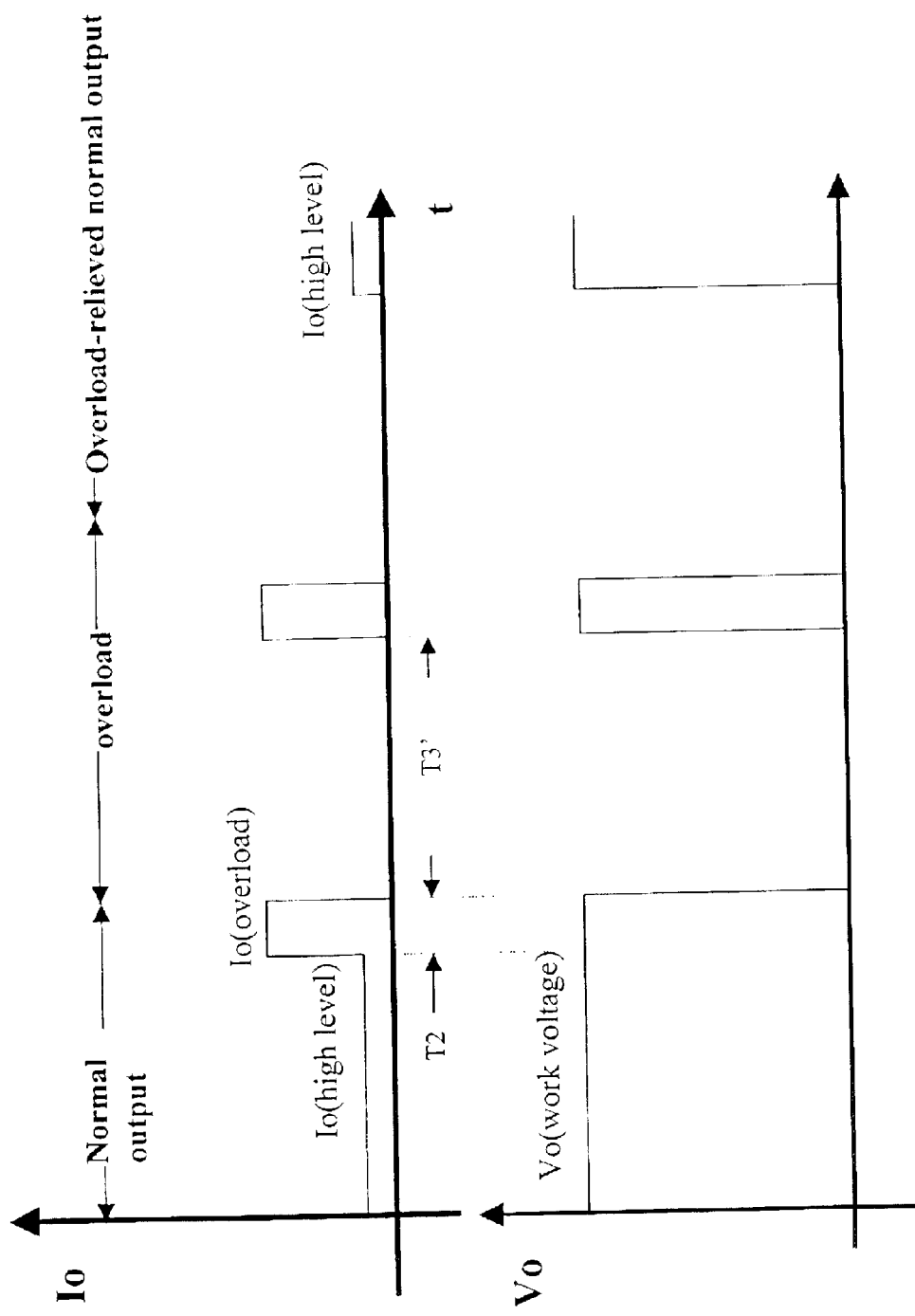
FIG. 4 is a sequence graph of the preferred embodiments of the invention, illustrating overload protection.
Figure 5:
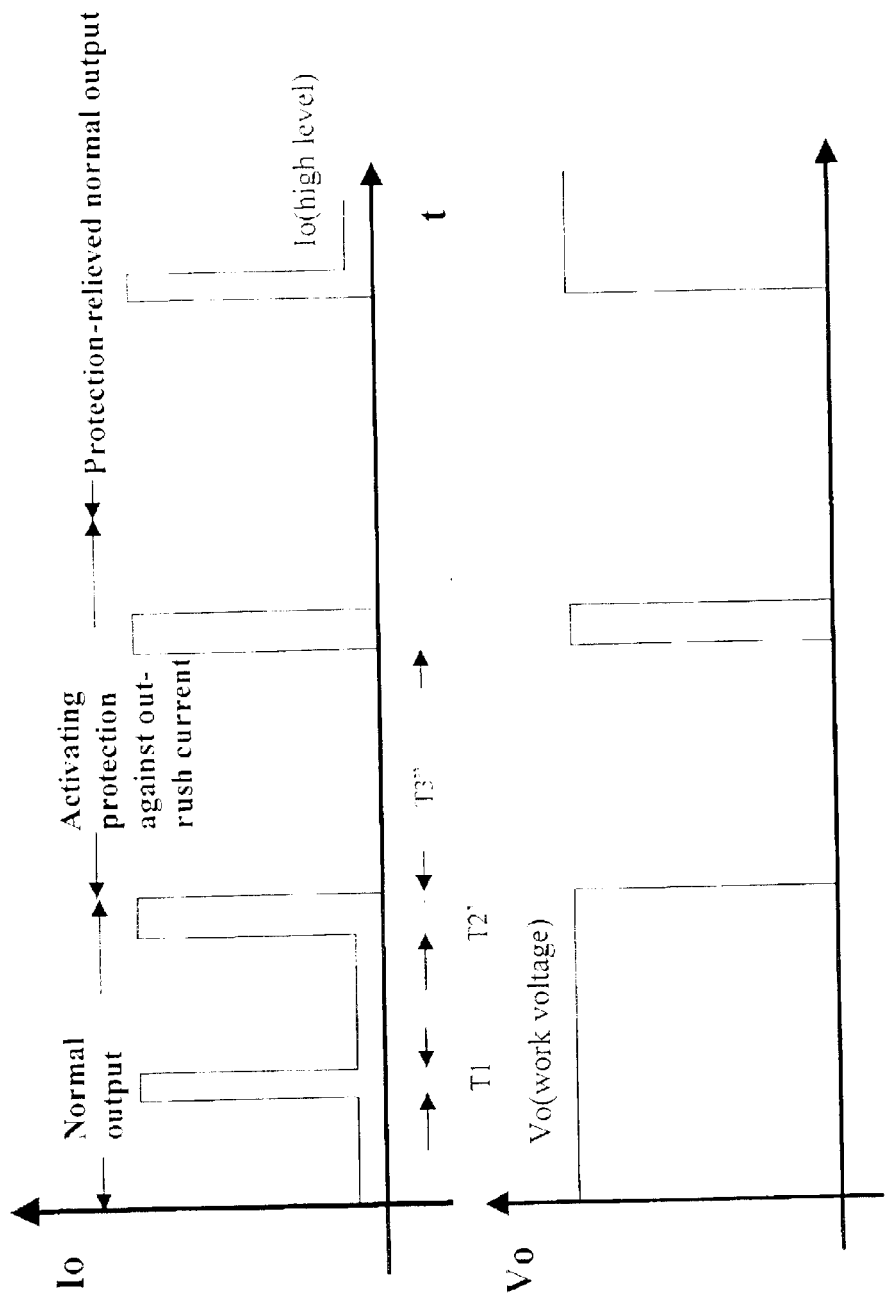
FIG. 5 is a sequence graph of the preferred embodiment of the invention, illustrating out-rush current protection.

The specific operation of the preferred embodiment in FIG. 2 must be described with the time sequence graphs shown in FIGS. 3, 4 and 5.

FIG. 3 is a time sequence graph when a short circuit happens at the output. It can be described together with FIG. 2. The output voltage is zero when the output is shortcircuited. This causes the voltage level generator 208 to generate a voltage level close to zero. The executor for activating the protection function 206 is forced to start working before the timer completes counting owing to the zero-volt voltage level; this is time T4 shown in FIG. 3. Therefore, the short circuit protection is activated when time T4 is up; T4 is smaller than T2 shown in FIG. 4. When the energy of the second power source 205 is insufficient, i.e. time T3 in FIG. 3 is up, the executor for activating protection function 206 would not work and the protection function is disabled. Then, the control system 204 would try to activate the system again. These steps would be repeated until the short circuit ceases and the output is normal.

The overload situation is described with reference to FIG. 4, together with FIG. 2. The output of the current sensor connected to the output end of the transformer 203 forces the timer to begin counting when the output current is larger than the predetermined overload current. The executor 206 forces the control system 204 to stop working and also keeps it in a shutdown state when the counting of the timer 209 is completed and the output current is still larger than the predetermined overload current. When the energy of the second power source 205 is insufficient, i.e. time T3' shown in FIG. 4 is up, the executor for activating the protection function 206 would not work and the protection function is cancelled. Then, the control system 204 would try to activate the system again. The output voltage and the output current appear as square waves when the output current is still larger than the predetermined overload current, as shown in FIG. 4. These steps would be repeated until the overload ceases and the output is normal.

FIG. 5 shows how the protection works when an out-rush current occurs. The output of the current sensor 207 connected to the output end of the transformer 203 forces the timer 209 to begin counting when an out-rush current occurs. A charger circuit included in the timer 209 restricts the maximum output time of the out-rush current and the overload current. The executor for activating protection function 206 would force the control system 204 to stop working when the timer completes counting, i.e. the time T2' shown in FIG. 5 is up. It had to be specially pointed out that the maximum allowable duration for out-rush current, i.e. T2' in FIG. 5, is shorter than that for the overload current, i.e. T2 in FIG. 4. The executor for activating the protection function 206 would disable the protection function when the energy of the second power source 205 is insufficient; i.e. time T3" is up. Then, the control system 204 would try to activate the system again. These steps would be repeated until the out-rush current ceases and the output is normal.

The allowable time of short-circuit (T4 in FIG. 3) is shorter than that of out-rush current (T2' in FG. 5), and the allowable time of out-rush current is short then that of overload current (T2 in FIG. 4). The duration between activation of each protection function and allowance of restarting the system is decided by the energy of the second power source 205, so T3, T3' and T3" in FIG. 3, FIG. 4 and FIG. 5, respectively, are not the same when the three protections occur. The timer 209 may be implemented by an RC charger circuit; the charging time is short when output current level is high, and the charging time is long when output current level is low.

Figure 6:
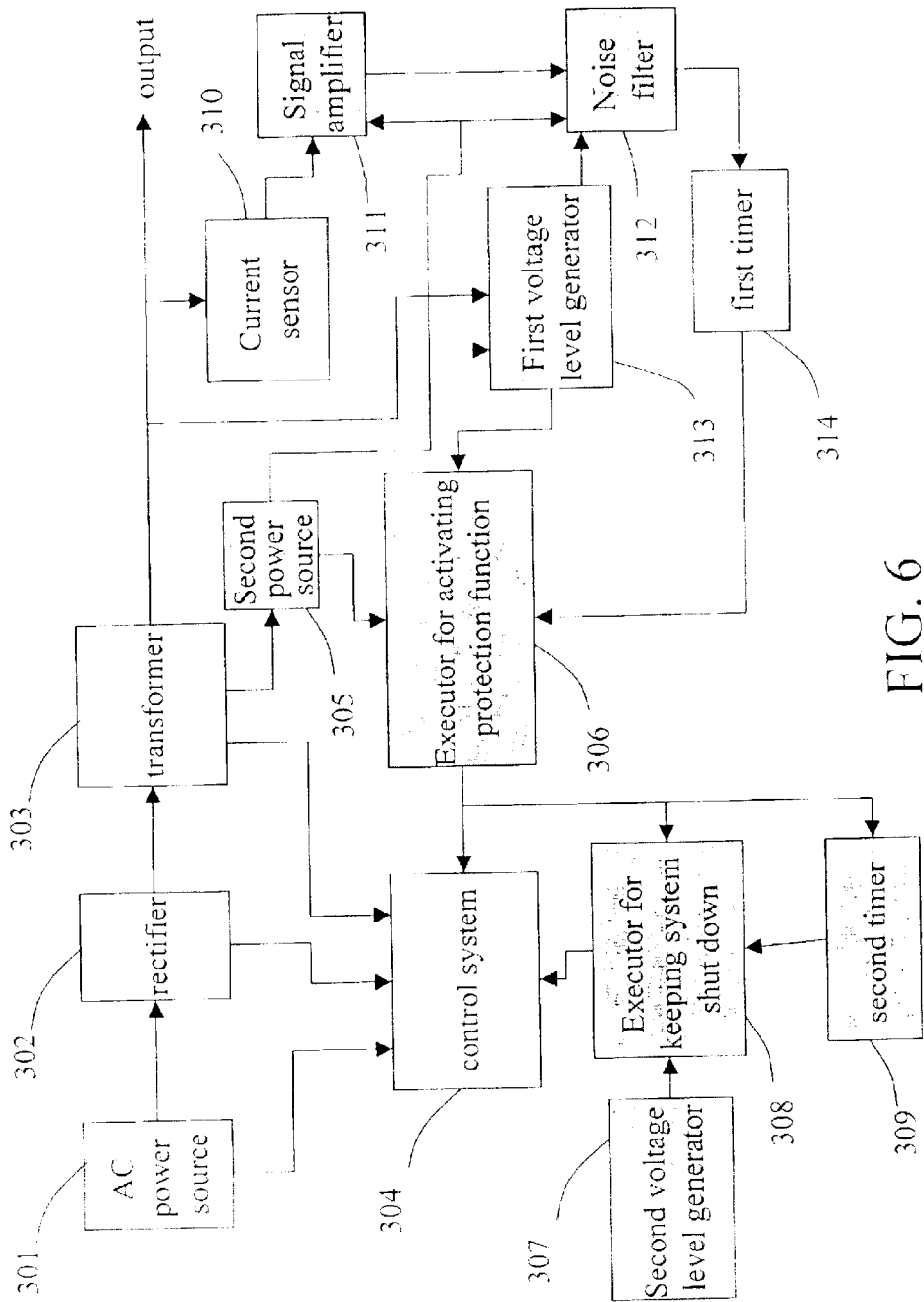
FIG. 6 is a block diagram of a three-in-one protection circuit against an out-rush current, short circuit and overload of a second preferred embodiment of the invention.

Please refer to FIG. 6 for the second preferred embodiment of the three-in-one protection circuit of the invention. It comprises a second power source 305, an executor for activating the protection function 306, an executor for keeping the system shut down 308, a current sensor 310, a first voltage level generator 313, a second voltage level generator 307, a first timer 314, a second timer 309, a signal amplifier 311 and a noise filter 312. Other parts such as an AC power source 301, a rectifier 302, a transformer 303 and a control system 304 are the normal elements of a power supply.

The transformer 303 provides the second power source 305 of the protection circuit. This second power source 305 is provided for three function blocks to use: the executor for activating the protection function 306, the signal amplifier 311 and the noise filter 312 (the virtual arrow line between the second power source 305 and the first voltage level generator 313 means the power to the voltage level generator 313 may be provided by the second power source 305 instead of the transformer 303. There is still energy transferred in the transformer even when a short circuit occurs. Although it is small, it is enough for the protection circuit to work normally.

The embodiment in FIG. 6 is described together with the time sequence graph shown in FIG. 3, FIG. 4 and FIG. 5.

Please refer to FIG. 3 together with FIG. 6. It shows the protection against a short circuit. The output voltage is zero when the output is short-circuited. This causes the first voltage level generator 313 to generate a voltage level close to zero. The executor for activating the protection function 306 is then forced to start working before the first timer 314 completes counting, i.e. time T4 in FIG. 3, owing to the zero-volt voltage level. Therefore, the maximum allowable duration for out-rush current, i.e. T4 in FIG. 3, is shorter than that for overload current, T2 in FIG. 4. After the protection is enabled by the executor 306, the control system 304 is kept in a shutdown state and the second timer starts counting. The executor 308 would stop shutting down the control system 304 when the second timer 309 completes counting, i.e. time T3 in FIG. 3 is up. Then, the control system 304 would try to activate the system again. These steps would be repeated until the short circuit ceases and the output is normal.

Please refer to FIG. 4 together with FIG. 6. It shows the protection against an overload. The signal sensed by the current sensor 310 may be pretty weak so it would be better to amplify that signal through the signal amplifier 311 first. However, the noise is also amplified. The noise filter 312 is used to filter that undesired amplified noise. The noise filter 312 would force the first timer 314 to start counting when the output current is larger than the predetermined overload current. The executor for activating the protection function 306 would force the control system 304 to stop working when counting is completed and the output current is still larger than the predetermined overload current. The executor 308 is then activated at the same time to keep the control system 304 shut down. The second timer 309 also starts counting when the executor 308 is activated. The control system 304 stops working during the counting period. The control system 304 would try to activate the system again when the counting of the second timer 309 is completed and the protection function is cancelled accordingly. The output voltage and the output current would appear as square waves if the output current is still larger than the predetermined overload current.

Please refer to FIG. 5 together with FIG. 6. It shows a protection against an out-rush current. After the signal from the current sensor 310 is amplified by the signal amplifier 311 and filtered by the noise filter 312, the first timer 314 would start counting if the out-rush current occurs. A charger circuit included in the first timer 314 restricts the maximum output time of the out-rush current and the overload current. The executor for activating protection function 306 would force the control system 304 to stop working when the time T2' in FIG. 5 is up. It had to be specially pointed out that the maximum output time T2' is the same as T2 when the protection against an out-rush current occurs due to the delay function of the noise filter 312. The T3 timer 309 also starts counting when the executor 308 is activated. The control system 304 is also shut down during the counting period. The executor 308 stops working and the shutdown state of the control system 304 is cancelled when the time T3 timer is up; i.e. time T3" is up. Then, the control system 304 can activate the system again. This is repeated until the short circuit ceases and the output is normal.

Compared to the first embodiment, there is additional capability against undesired noise in the second embodiment. The allowable time of overload current (T2 in FIG. 4) may be designed to be equal to that of out-rush current (T2' in FIG. 5), but the allowable time of short-circuit (T4 in FIG. 3) would surely be shorter than T2 or T2'; T3, T3' and T3" are all decided by the second timer so T3, T3' and T3" are the same when the three protections occur. The first timer 314 may be implemented by an RC charger circuit; the second timer 309 may be implemented by an RC discharger circuit.

The characteristics of the first embodiment of the invention are shown as follows.

Any improper operation does not influence the power source of the protection circuit. An independent rectifier circuit in the second power source is used to transform energy from the output side of the transformer to supply the operation of the protection circuit. Hence there is still energy transferred from the transformer even during a short circuit. Although it is small, it is enough to supply the protection circuit to operate normally.

An independent voltage generator is used to generate an accurate voltage level to help to determine which protection function needs to be activated.

The maximum allowable duration of an out-rush current and overload current can be controlled by the timer. The timer can be implemented by an RC charger circuit to limit the maximum time of the output of the out-rush current and the overload current.

The duration between the control system of the power supply being shutted down by certain protection function and the control system trying to activate the system again can be controlled. In the first embodiment, the second power source can be implemented to include an RC discharger circuit to limit that period.

The average power loss is very small during the protection against the short circuit. The output voltage is close to zero once the output is short-circuited. That makes the voltage level generator generate a zero-volt voltage level and then makes the executor shut down the control system within a very short period. The short period would keep the power loss during the short circuit quite low.

The second embodiment has the following characteristics.

Any improper operation does not influence the power source of the protection circuit. An independent rectifier circuit in the second power source is used to transform energy from the output side of the transformer to supply the operation of the protection circuit. Hence there is still energy transferred from the transformer even during a short circuit. Although it is small, it is enough to supply the protection circuit to operate normally.

There is excellent capability in the protection circuit against undesired noise. The current sensor in a power supply may be implemented by a resistor very often and would result in some noise. The problem can be resolved by the signal amplifier and the noise filter.

An independent voltage generator is used to generate an accurate voltage level to help to determine which protection function needs to be activated.

The maximum allowable duration of the out-rush current and the overload current can be controlled by the first timer. The first timer can be implemented by a RC charger circuit to limit the maximum time of the output of the out-rush current and the overload current.

The duration between the control system of the power supply being shutted down by certain protection function and the control system trying to activate the system again can be controlled. In the second embodiment, the second timer can be implemented by an RC discharger circuit to limit that period.

The average power loss is very small during the protection against the short circuit. The output voltage is close to zero once the output is short-circuited. That makes the voltage level generator generate a zero-volt voltage level and then makes the executor shut down the control system within a very short period. The short period would keep the power loss during the short circuit quite low.

What is claimed is:

1. A three-in-one circuit protection circuit against a out-rush current, short circuit and overload, used in a power supply with a transformer and control system, comprising:

a second power source, connected to the output side of said transformer;

a current sensor, connected to the output side of said transformer, for generating a signal corresponding to the sensed output current;

a voltage level generator, connected to the output side of said transformer, for generating an accurate voltage level;

a timer, used to receive said signal from said current sensor, and to start counting when the output current is larger than a predetermined overload current, and to generate an overload protection control signal is generated when a predetermined time is up; and an executor for activating a protection function, connected to said control system, said second source power, said voltage level generator and said timer respectively, sending a shutdown signal to said control system when receiving a voltage level corresponding to short circuit from said voltage level generator or when receiving said overload protection control signal from said timer based on overload or out-rush current;

wherein said second power source is the power source of said executor for activating the protection function when said executor for activating the protection function sends out said shutdown signal, said control system starts working when the energy of said second power source is consumed up.

2. The circuit of claim 1, wherein said second power source comprises a rectifier circuit.

3. The circuit of claim 1, wherein said second power source comprises an RC discharger circuit.

4. The circuit of claim 1, wherein said timer is an RC charger circuit.

5. The circuit of claim 1, wherein said current sensor is a resistor.

6. The circuit of claim 1, wherein a signal amplifier and a noise filter are further connected between said current sensor and said timer, and said signal from said current sensor is amplified by said signal amplifier and filtered by said noise filter.

7. The circuit of claim 6, wherein said noise filter is a Schmitt trigger circuit.

8. A three-in-one circuit protection circuit against a out-rush current, short circuit and overload, used in a power supply with a transformer and control system, comprising:

a second power source, connected to the output side of said transformer;

a current sensor, connected to the output side of said transformer, for generating a signal corresponding to the sensed output current;

a first voltage level generator, connected to the output side of said transformer, for generating an accurate voltage level;

a signal amplifier, connected to said current sensor and said second power source, and used to receive and amplify said signal from said current sensor;

a noise filter, connected to said signal amplifier, said first voltage generator and said second power source, and used to filter said amplified signal from said signal amplifier;

a first timer, used to receive said amplified and filtered signal from said noise filter, to start counting when said amplified and filtered output current is larger than a predetermined overload current, and to generate an overload protection control signal when a predetermined time is up;

an executor for activating a protection function, connected to said control system, said second source power, said first voltage level generator and said first timer respectively, sending a shutdown signal to said control system when receiving a voltage level corresponding to short circuit from said first voltage level generator or when receiving said overload protection control signal from said first timer based on overload or out-rush current;

a second voltage level generator, used to generate a second voltage level;

an executor for keeping the system shut down, connected to said control system, said executor for activating the protection function and said second voltage level generator, and used to receive a shutdown signal transmitted from said executor for activating the protection function to keep said control system shut down; and a second timer, connected to said executor for activating the protection function and said executor for keeping the system shut down, and used to start counting when said executor for activating the protection function sends out said shut down signal, and then to make said executor for keeping the system shut down send a start working signal to said control system after completing counting to a predetermined time.

9. The circuit of claim 8, wherein said second power source comprises a rectifier circuit.

10. The circuit of claim 8, wherein said second power source comprises an RC discharger circuit.

11. The circuit of claim 8, wherein said first timer is an RC charger circuit.

12. The circuit of claim 8, wherein said second timer is an RC discharger circuit.

13. The circuit of claim 7, wherein said current sensor is a resistor.

14. The circuit of claim 8, wherein said noise filter is a Schmitt trigger circuit.

* * * * *